United States Patent
Tsukamoto et al.

(10) Patent No.: US 10,450,719 B2
(45) Date of Patent: *Oct. 22, 2019

(54) BULLDOZER

(71) Applicant: KOMATSU LTD., Tokyo (JP)

(72) Inventors: Takashi Tsukamoto, Tokyo (JP); Kazuki Kure, Tokyo (JP); Etsuo Fujita, Tokyo (JP); Sueyoshi Nishimine, Tokyo (JP); Masahiro Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,488

(22) Filed: Apr. 17, 2019

(65) Prior Publication Data
US 2019/0242089 A1 Aug. 8, 2019

Related U.S. Application Data

(63) Continuation of application No. 15/503,440, filed as application No. PCT/JP2016/076634 on Sep. 9, 2016.

(51) Int. Cl.
*B60R 9/00* (2006.01)
*B66C 3/00* (2006.01)
(Continued)

(52) U.S. Cl.
CPC .............. *E02F 3/7609* (2013.01); *E02F 3/76* (2013.01); *E02F 3/815* (2013.01); *E02F 9/163* (2013.01);
(Continued)

(58) Field of Classification Search
CPC . E02F 3/7609; E02F 3/76; E02F 3/815; E02F 9/163; E02F 9/2271; H04N 7/181
(Continued)

(56) References Cited

U.S. PATENT DOCUMENTS 8,272,467 B1 9/2012 Staab
2007/0157490 A1 7/2007 Vanneman et al.
(Continued)

FOREIGN PATENT DOCUMENTS

JP 50-11607 U 4/1975
JP 9-3978 A 1/1997
(Continued)

OTHER PUBLICATIONS

The International Search Report for the corresponding international application No. PCT/JP2016/076634, dated Nov. 15, 2016.
(Continued)

*Primary Examiner* — Patricia I Young
(74) *Attorney, Agent, or Firm* — Global IP Counselors, LLP

(57) ABSTRACT

A bulldozer includes a blade disposed in front of a vehicle body. First and second cameras are disposed to the left and right of the vehicle body, respectively. A first optical axis of the first camera faces forward and downward. The first camera overlaps a left crawler belt as seen in a plan view of the bulldozer and is arranged to capture a first image of a gap between a lower edge of the blade and the left crawler belt. A second optical axis of the second camera faces forward and downward. The second camera overlaps a right crawler belt as seen in a plan view of the bulldozer and is arranged to capture a second image of a gap between a lower edge of the blade and the right crawler belt. A display is configured to display the first and second images side-by-side.

14 Claims, 10 Drawing Sheets

(51) Int. Cl.

| | | |
|---|---|---|
| *E02F 3/76* | (2006.01) | |
| *H04N 7/18* | (2006.01) | |
| *E02F 9/22* | (2006.01) | |
| *E02F 9/16* | (2006.01) | |
| *E02F 3/815* | (2006.01) | |
| *E02F 9/28* | (2006.01) | |

(52) U.S. Cl.
CPC ........... *E02F 9/2271* (2013.01); *H04N 7/181* (2013.01); *E02F 9/2296* (2013.01); *E02F 9/2875* (2013.01)

(58) Field of Classification Search
USPC ........................................................ 348/148
See application file for complete search history.

(56) References Cited

U.S. PATENT DOCUMENTS

| | | | |
|---|---|---|---|
| 2011/0169949 A1 | 7/2011 | McCain et al. | |
| 2012/0236142 A1* | 9/2012 | Enix | E02F 9/2045 348/118 |
| 2013/0169469 A1 | 7/2013 | Mitsuta et al. | |
| 2013/0182066 A1 | 7/2013 | Ishimoto | |
| 2014/0078761 A1 | 3/2014 | Miyasaka et al. | |
| 2015/0225923 A1 | 8/2015 | Wallace et al. | |
| 2017/0002543 A1 | 1/2017 | Wada et al. | |
| 2017/0050566 A1 | 2/2017 | Yamashita et al. | |
| 2018/0223503 A1 | 8/2018 | Imano | |

FOREIGN PATENT DOCUMENTS

| | | |
|---|---|---|
| JP | 9-39649 A | 2/1997 |
| JP | 2013-517394 A | 5/2013 |
| JP | 3197633 U | 4/2015 |
| JP | 2015-139158 A | 7/2015 |

OTHER PUBLICATIONS

"Remote Control Robot "Robo Q" for Bulldozer" [online], Ministry of Land, Infrastructure and Transport (Japan), Regional Development Bureau of Kyushu Region, Kyushu Technical Office [Date retrieved: Sep. 1, 2016] Internet: (URL:http://www.qsr.mlit.go.jp/kyugi/tech_develop/kaihatsu_naiyou/kaihatsu_03.html).

* cited by examiner

BULLDOZER

CROSS-REFERENCE TO RELATED APPLICATIONS

This application is a continuation of U.S. patent application Ser. No. 15/503,440, filed Feb. 13, 2017, which is a U.S. National stage application of International Application No. PCT/JP2016/076634, filed on Sep. 9, 2016. The entire disclosures of U.S. patent application Ser. No. 15/503,440 and International Application No. PCT/JP2016/076634 are hereby incorporated herein by reference in their entireties.

BACKGROUND

Field of the Invention

The present invention relates to a bulldozer.

Background Information

A technique is known for capturing images of the surroundings of a bulldozer with a camera attached to the bulldozer and displaying the images taken by the camera on a display ("Remote Control Robot "Robo Q" for Bulldozer" [online], Ministry of Land, Infrastructure and Transport (Japan), Regional Development Bureau of Kyushu Region, Kyushu Technical Office. Two cameras are attached to the roof of the cab of the bulldozer and the cameras capture images in front and to the rear of the bulldozer in this technique.

SUMMARY

In order to know the progress of work by the blade of a bulldozer, it is preferable to obtain images near the lower edge on the right and left of the blade. Moreover, in order to realize the traveling state of a bulldozer, it is preferable to obtain images of the rotation conditions of the crawler belts. In particular, if the conditions near the lower edge on the right and left of the blade and the rotation conditions of the crawler belts can be displayed on the same screen, the progress of work and the traveling state can be easily understood.

However, the right and left lower edges of the blade and the right and left crawler belts are positioned to the outside of the cab in the vehicle width direction. As a result, it is difficult to capture images of the right and left lower edges of the blade and the right and left crawler belts on both sides at the same time while capturing images of the blade in the front with a camera attached to the roof as in the above-mentioned technique.

An object of the present invention is to easily understand the progress of work and the traveling state with a camera attached to a bulldozer.

A bulldozer according to a first aspect includes a vehicle body, a blade, a left crawler belt, a right crawler belt, a first camera, a second camera, and a display. The blade is disposed in front of the vehicle body. The left crawler belt is disposed to the left of the vehicle body. The right crawler belt is disposed to the right of the vehicle body. The first camera is disposed to the left of the vehicle body and is disposed so that the first optical axis of the first camera faces forward and downward. The first camera overlaps the left crawler belt as seen in a plan view of the bulldozer and is arranged to capture a first image of a gap between a lower edge of the blade and the left crawler belt. The second camera is disposed to the right of the vehicle body and is disposed so that the second optical axis of the second camera faces forward and downward. The second camera overlaps the right crawler belt as seen in a plan view of the bulldozer and is arranged to capture a second image of a gap between a lower edge of the blade and the right crawler belt. The display is configured to display the first and second images side-by-side.

A bulldozer body according to a second aspect includes a vehicle body, a left crawler belt, a right crawler belt, a first camera, a second camera, and a display. The vehicle body includes an engine compartment. The left crawler belt is disposed to the left of the vehicle body. The right crawler belt is disposed to the right of the vehicle body. The first camera is disposed to the left of the vehicle body and is disposed so that the first optical axis of the first camera faces forward and downward. The first camera overlaps the left crawler belt as seen in a plan view of the bulldozer and is arranged to capture a first image of a gap between a lower edge of the blade and the left crawler belt. The second camera is disposed to the right of the vehicle body and is disposed so that the second optical axis of the second camera faces forward and downward. The second camera overlaps the right crawler belt as seen in a plan view of the bulldozer and is arranged to capture a second image of a gap between a lower edge of the blade and the right crawler belt. The display is configured to display the first and second images side-by-side.

The progress of work and the traveling state can be easily understood from the images captured by the first camera and the second camera in the bulldozer body according to the present aspect.

According to the present invention, the progress of work and the traveling state can be easily understood with a camera attached to a bulldozer.

DESCRIPTION OF EXEMPLARY EMBODIMENTS

Figure 1:
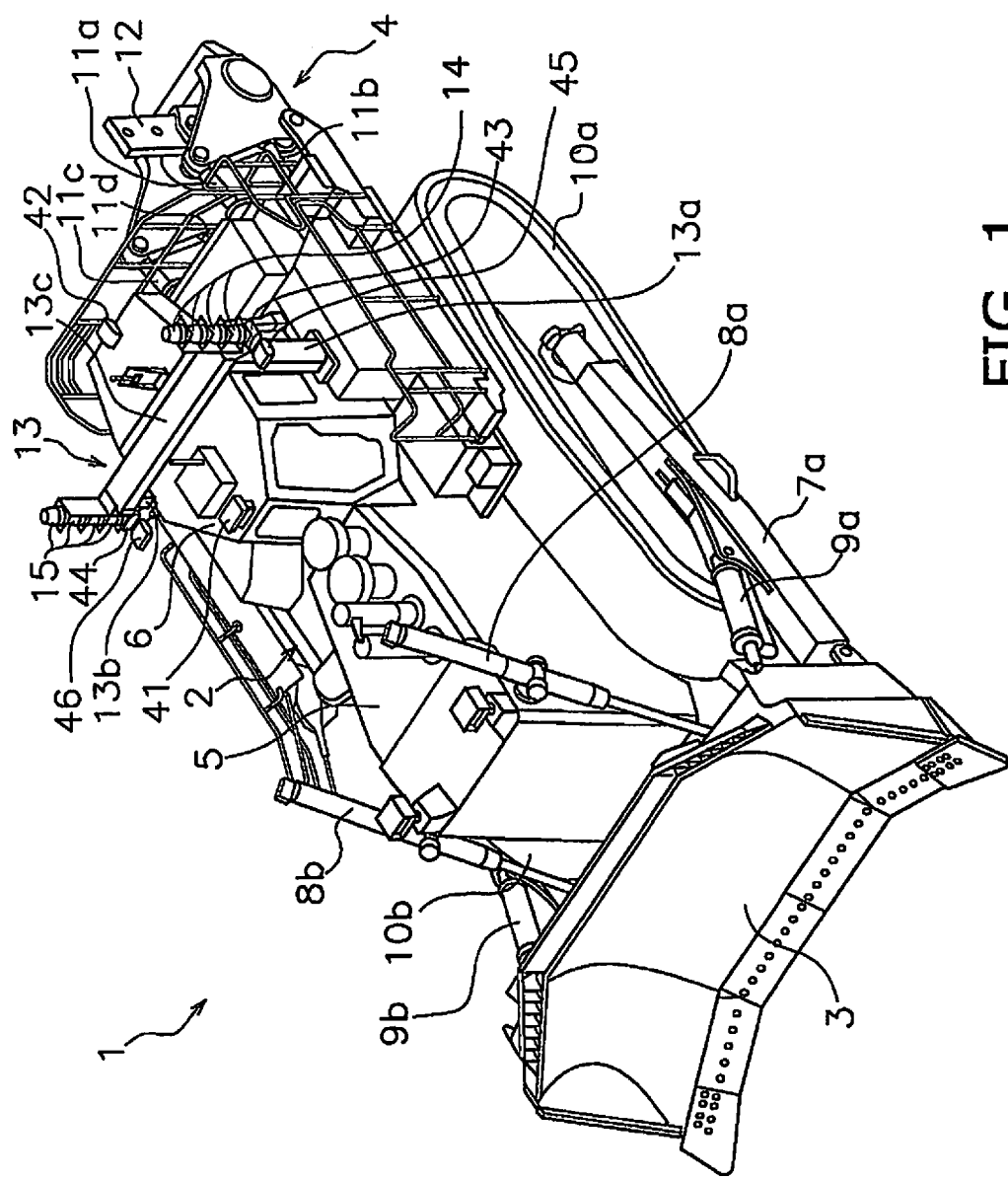
FIG. 1 is a perspective view of a bulldozer according to the present exemplary embodiment.
Figure 2:
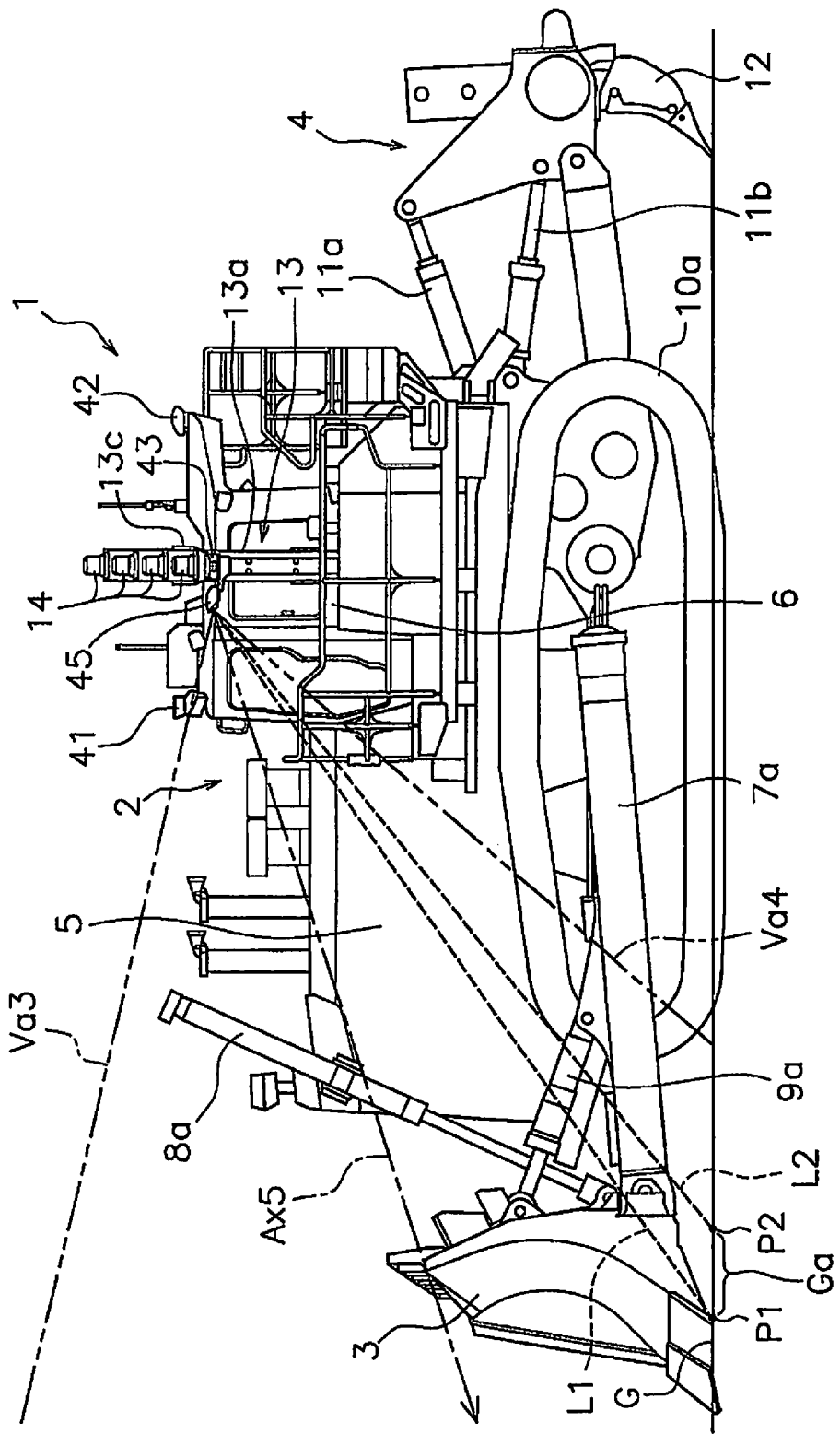
FIG. 2 is a side view of the bulldozer.
Figure 3:
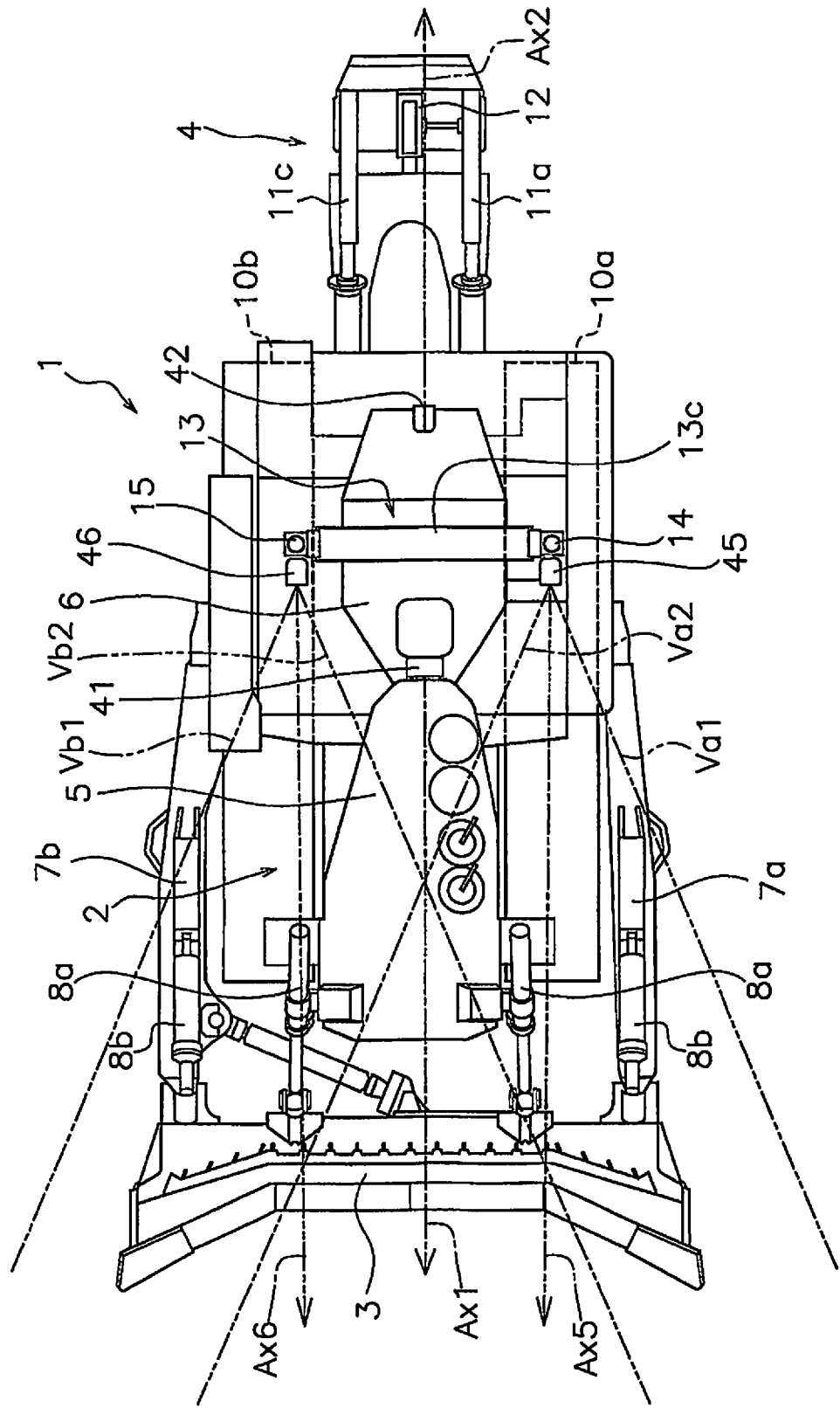
FIG. 3 is a plan view of the bulldozer.

The following is a description of a bulldozer according to the present exemplary embodiment with reference to the drawings. FIG. 1 is a perspective view of a bulldozer 1 according to the present exemplary embodiment. FIG. 2 is a side view of the bulldozer 1. FIG. 3 is a plan view of the bulldozer 1. As illustrated in FIGS. 1 to 3, the bulldozer 1 includes a vehicle body 2, left and right crawler belts 10a and 10b, a blade 3, and a ripper device 4.

The vehicle body 2 includes an engine compartment 5 and a cab 6. The engine compartment 5 is provided in the front portion of the vehicle body 2. The engine compartment 5 is disposed to the rear of the blade 3. An engine 21 (see FIG. 4) is disposed inside the engine compartment 5. The cab 6 is disposed to the rear of the engine compartment 5.

The left and right crawler belts 10a and 10b are devices for causing the bulldozer 1 to travel. The left crawler belt 10a is disposed to the left of the vehicle body 2. The right crawler belt 10b is disposed to the right of the vehicle body 2. The left and right crawler belts 10a and 10b are driven by a driving power from the engine 21, whereby the bulldozer 1 travels.

The blade 3 is disposed in front of the vehicle body 2. The blade 3 is supported by a left arm 7a and a right arm 7b. The left arm 7a is attached to the left side portion of the vehicle body 2. The right arm 7b is attached to the right side portion of the vehicle body 2.

The bulldozer 1 includes left and right lift cylinders 8a and 8b and left and right tilt cylinders 9a and 9b. The left and right lift cylinders 8a and 8b and the left and right tilt cylinders 9a and 9b are hydraulic cylinders and extend and contract due to hydraulic fluid discharged from a hydraulic pump 22 (see FIG. 4). The left and right lift cylinders 8a and 8b are connected to the blade 3 and the vehicle body 2. The left and right lift cylinders 8a and 8b move the blade 3 up and down. While two lift cylinders are provided in the present exemplary embodiment, the number of lift cylinders may be one.

The left tilt cylinder 9a is connected to the blade 3 and the left arm 7a. The right tilt cylinder 9b is connected to the blade 3 and the right arm 7b. The left and right tilt cylinders 9a and 9b move the blade 3 to the left and right.

The ripper device 4 is disposed to the rear of the vehicle body 2. The ripper device 4 is attached to the rear portion of the vehicle body 2. The ripper device 4 includes hydraulic cylinders 11a-11d and a shank 12. The hydraulic cylinders 11a-11d are driven by hydraulic fluid from the hydraulic pump 22 and consequently move the shank 12 up and down. The ripper device 4 may be omitted.

The bulldozer 1 includes a roll over protective structure (ROPS) 13. The ROPS 13 is erected on the upper surface of the vehicle body 2 and is disposed so as to surround the cab 6 from the left and right sides and from above. The ROPS 13 includes a left pillar portion 13a, a right pillar portion 13b, and a beam portion 13c. The left pillar portion 13a is disposed to the left of the cab 6 and extends in the up-down direction. The right pillar portion 13b is disposed to the right of the cab 6 and extends in the up-down direction. The beam portion 13c is disposed above the cab 6 and connects the left pillar portion 13a and the right pillar portion 13b. The ROPS 13 is a gate-like frame that covers the cab in the left and right directions.

Figure 6:
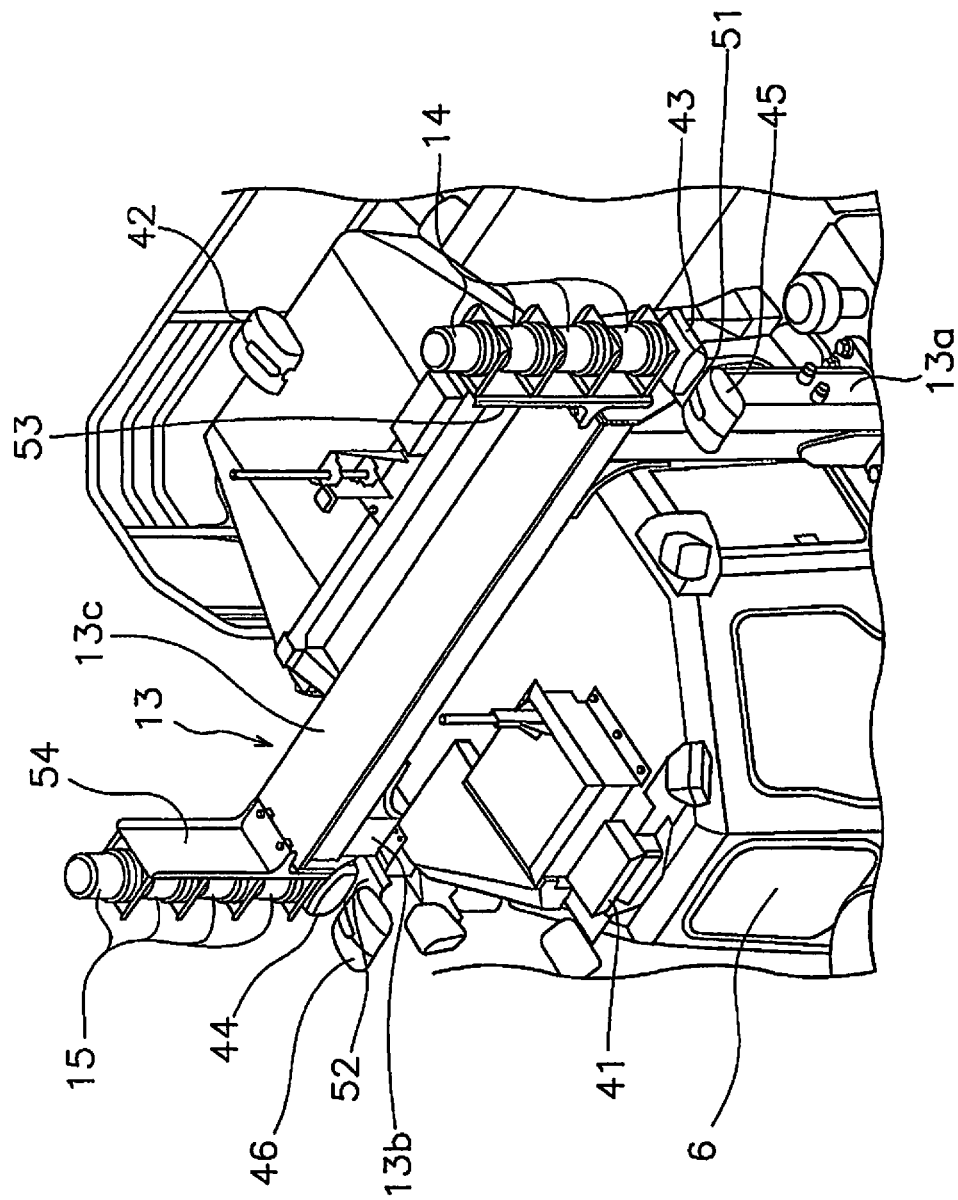
FIG. 6 is an enlarged perspective view of the left front camera and the surroundings thereof.

A plurality of left indicator lamps 14 and a plurality of right indicator lamps 15 are attached to the ROPS 13. The indicator lamps 14 and 15 are rotating lamps. However, the left indicator lamps 14 and the right indicator lamps 15 may be a type of indicator lamp other than a rotating lamp. The plurality of left indicator lamps 14 are attached to the left pillar portion 13a and are disposed in the up-down direction. As illustrated in FIG. 6, the plurality of left indicator lamps 14 are attached to the left pillar portion 13a via a first bracket 53. The first bracket 53 protrudes upward from the ROPS 13.

The plurality of right indicator lamps 15 are attached to the right pillar portion 13b and are disposed in the up-down direction. The plurality of right indicator lamps 15 are attached to the right pillar portion 13b via a second bracket 54. The second bracket 54 protrudes upward from the ROPS 13.

Figure 4:
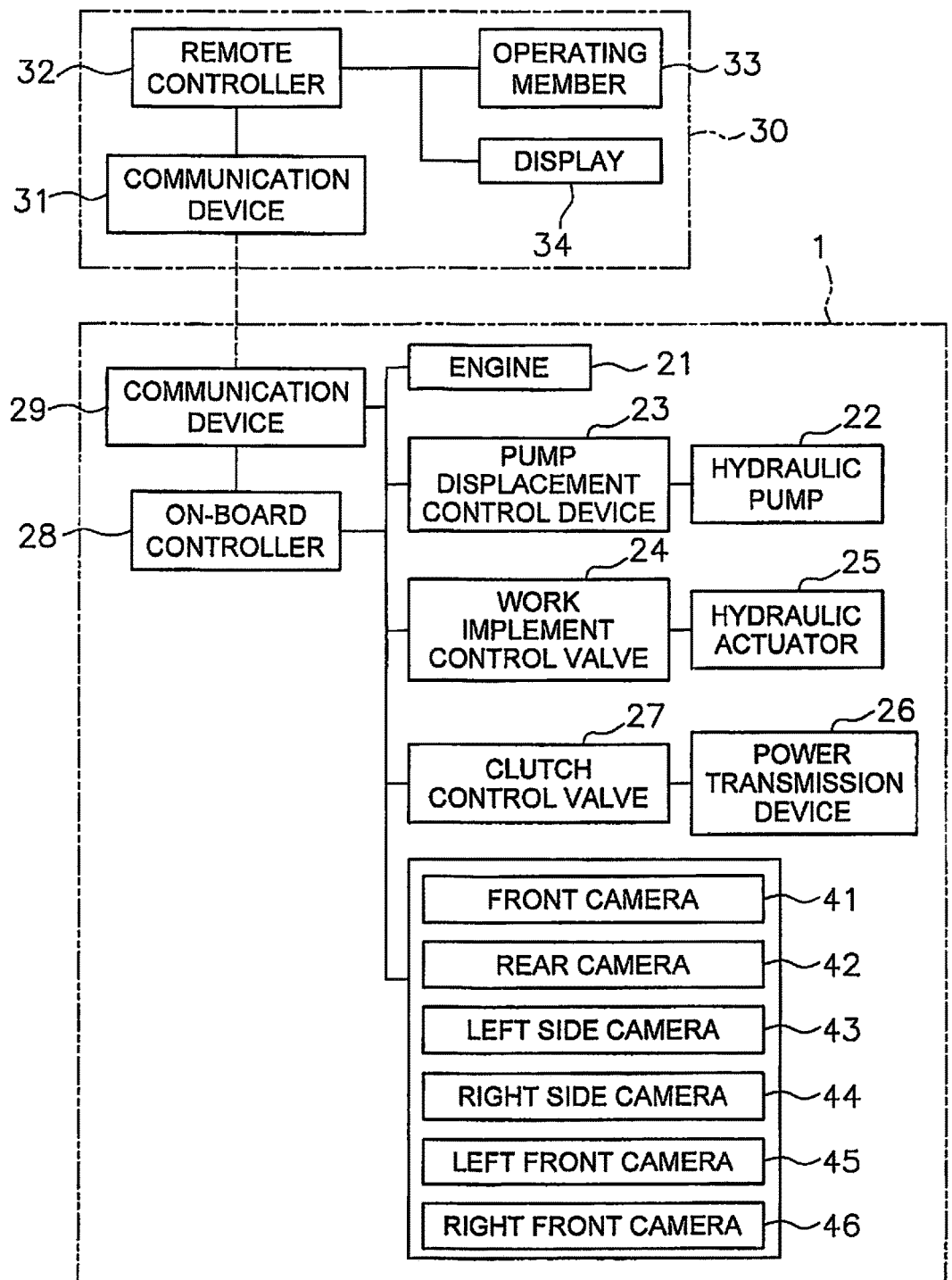
FIG. 4 is a block diagram illustrating a control system of the bulldozer.

FIG. 4 is a block diagram illustrating a control system of the bulldozer 1. As illustrated in FIG. 4, the bulldozer 1 includes the engine 21, the hydraulic pump 22, and a pump displacement control device 23. The hydraulic pump 22 is driven by the engine 21 to discharge hydraulic fluid. The hydraulic pump 22 is a variable displacement pump. The pump displacement control device 23 controls the discharge displacement of the hydraulic pump 22. For example, the pump displacement control device 23 includes a spool coupled to a swash plate or an inclined shaft of the hydraulic pump 22. The discharge displacement of the hydraulic pump 22 is changed due to the spool of the pump displacement control device 23 being driven.

The bulldozer 1 includes a work implement control valve 24 and a hydraulic actuator 25. The hydraulic actuator 25 is driven by hydraulic fluid discharged from the hydraulic pump 22. The hydraulic actuator 25 includes the above-mentioned left and right lift cylinders 8a and 8b and the left and right tilt cylinders 9a and 9b. Moreover, the hydraulic actuator 25 includes the hydraulic cylinders 11a-11d of the ripper device 4. The work implement control valve 24 controls the supply and exhaust of the hydraulic fluid to and from the hydraulic actuator 25.

The bulldozer 1 includes a power transmission device 26 and a clutch control valve 27. The power transmission device 26 includes, for example, a transmission and a torque converter. The clutch control valve 27 controls the switching of a speed change clutch, a forward/reverse clutch, and a steering clutch and the like included in the power transmission device 26.

The bulldozer 1 according to the present exemplary embodiment is a vehicle that can be operated remotely. As illustrated in FIG. 4, the bulldozer 1 includes an on-board controller 28 and a communication device 29. The communication device 29 is connected to an antenna mounted on the vehicle body 2. The communication device 29 carries out communication wirelessly with a communication device 31 of a remote operating device 30. For example, the remote operating device 30 is disposed in a management center away from the work site where the bulldozer 1 is being used. Alternatively, the remote operating device 30 may be portable and may be disposed at the work site.

The on-board controller 28 is configured with a computation device, such as a CPU, and a memory, such as a RAM or a ROM, or a storage device, such as a hard disk. The on-board controller 28 is programmed to control the bulldozer 1 on the basis of operation signals from the remote operating device 30.

The remote operating device 30 includes a remote controller 32 and an operating member 33. The remote controller 32 is configured with a computation device, such as a CPU, and a memory, such as a RAM or a ROM, or a storage device, such as a hard disk.

The operating member 33 is operated by an operator. For example, the operating member 33 includes a deceleration operating member for adjusting the output of the engine 21. The operating member 33 includes a blade operating member for operating the blade 3. The operating member 33 includes a ripper operating member for operating the ripper device 4. The operating member 33 includes a steering operating member for changing the traveling direction of the bulldozer 1 to the right and left. The deceleration operating member, the blade operating member, the ripper operating member, and the steering operating member may be a pedal, a lever, a wheel, a button, or a switch and the like.

The remote controller 32 transmits operation signals which indicate an operation by the operating member 33 to the on-board controller 28 of the bulldozer 1 via the communication devices 31 and 29. The on-board controller 28 controls the above-mentioned devices and the control valves in response to the received operation signals. For example, the on-board controller 28 controls the engine 21 in response to the operation of the deceleration operating member. As a result, the engine rotation speed is controlled. The on-board controller 28 controls the work implement control valve 24 in response to the operation of the blade operating member or the ripper operating member. As a result, the actions of the blade 3 or the ripper device 4 are controlled.

The bulldozer 1 includes a plurality of cameras 41-46 for capturing images of the surroundings of the bulldozer 1. The plurality of cameras 41-46 include a middle front camera 41, a rear camera 42, a left side camera 43 (third camera), a right side camera 44 (fourth camera), a left front camera 45 (first camera), and a right front camera 46 (second camera).

The middle front camera 41 captures images in front of the bulldozer 1. As illustrated in FIG. 1, the middle front camera 41 is attached to the front portion of the upper surface of the roof of the cab 6. The middle front camera 41 is disposed in the middle in the vehicle width direction on the upper surface of the roof of the cab 6. The rear camera 42 captures images to the rear of the bulldozer 1. The rear camera 42 is attached to the rear portion of the upper surface of the roof of the cab 6. The rear camera 42 is disposed in the middle in the vehicle width direction on the upper surface of the roof of the cab 6. As illustrated in FIG. 3, an optical axis Ax1 of the middle front camera 41 extends toward the front as seen in the plan view of the vehicle. An optical axis Ax2 of the rear camera 42 extends to the rear as seen in the plan view of the vehicle.

Figure 7:
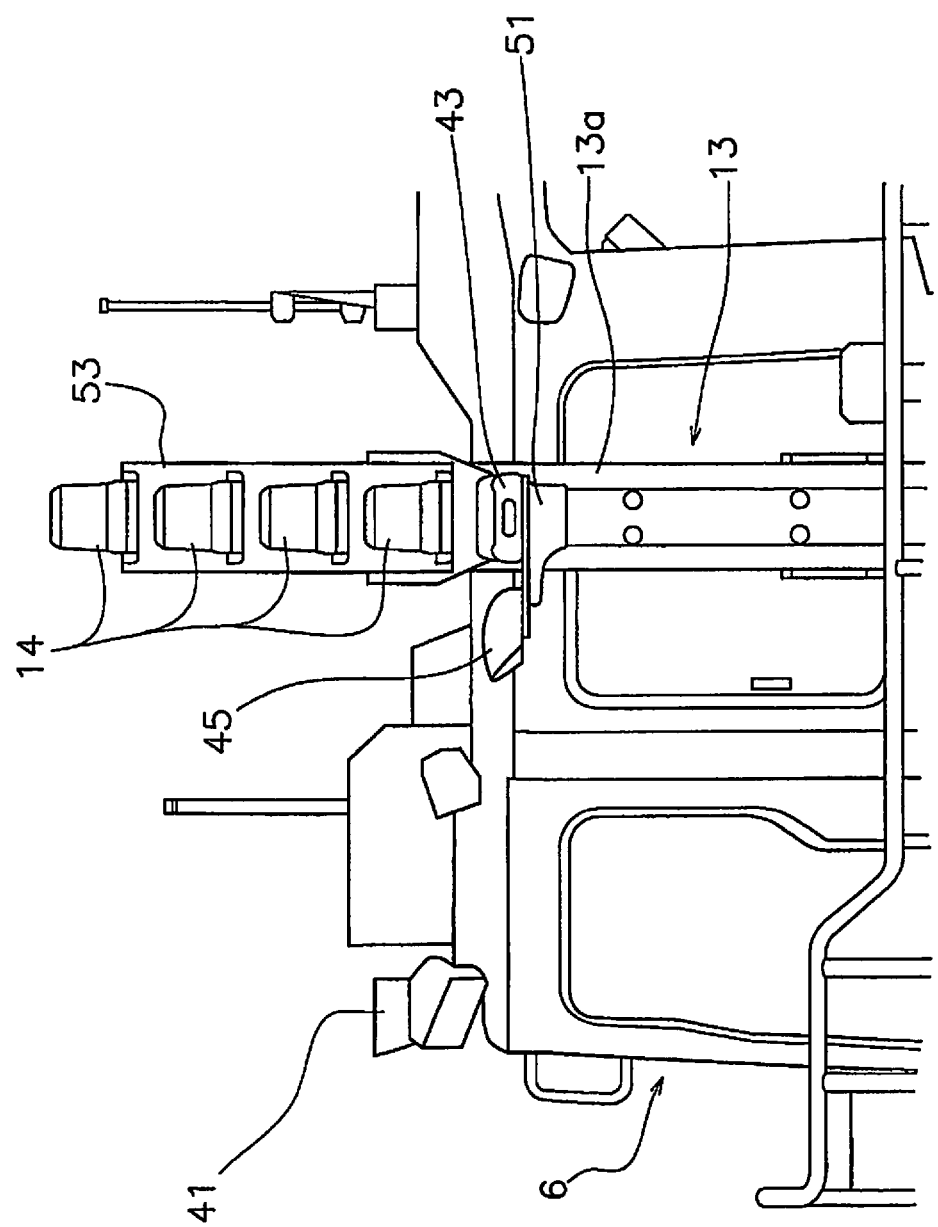
FIG. 7 is an enlarged side view of the left front camera and the surroundings thereof.

The left side camera 43 captures images to the left of the bulldozer 1. The left side camera 43 is attached to the left pillar portion 13a. As illustrated in FIG. 7, the left side camera 43 is attached to the left pillar portion 13a via a left bracket 51. The left side camera 43 is disposed further to the left than the left pillar portion 13a. As illustrated in FIG. 2, the left side camera 43 overlaps the left pillar portion 13a as seen in a side view of the vehicle. The left side camera 43 is disposed below the plurality of left indicator lamps 14. Specifically, the left side camera 43 is disposed below the lamp positioned furthest to the bottom among the plurality of left indicator lamps 14. However, the left side camera 43 may be disposed among the plurality of left indicator lamps 14. Alternatively, the left side camera 43 may be disposed above the plurality of left indicator lamps 14.

The right side camera 44 captures images to the right of the bulldozer 1. As illustrated in FIG. 6, the right side camera 44 is attached to the right pillar portion 13b. The right side camera 44 is attached to the right pillar portion 13b via a right bracket 52. The right side camera 44 is disposed in approximately left-right symmetry with the left side camera 43.

Figure 5:
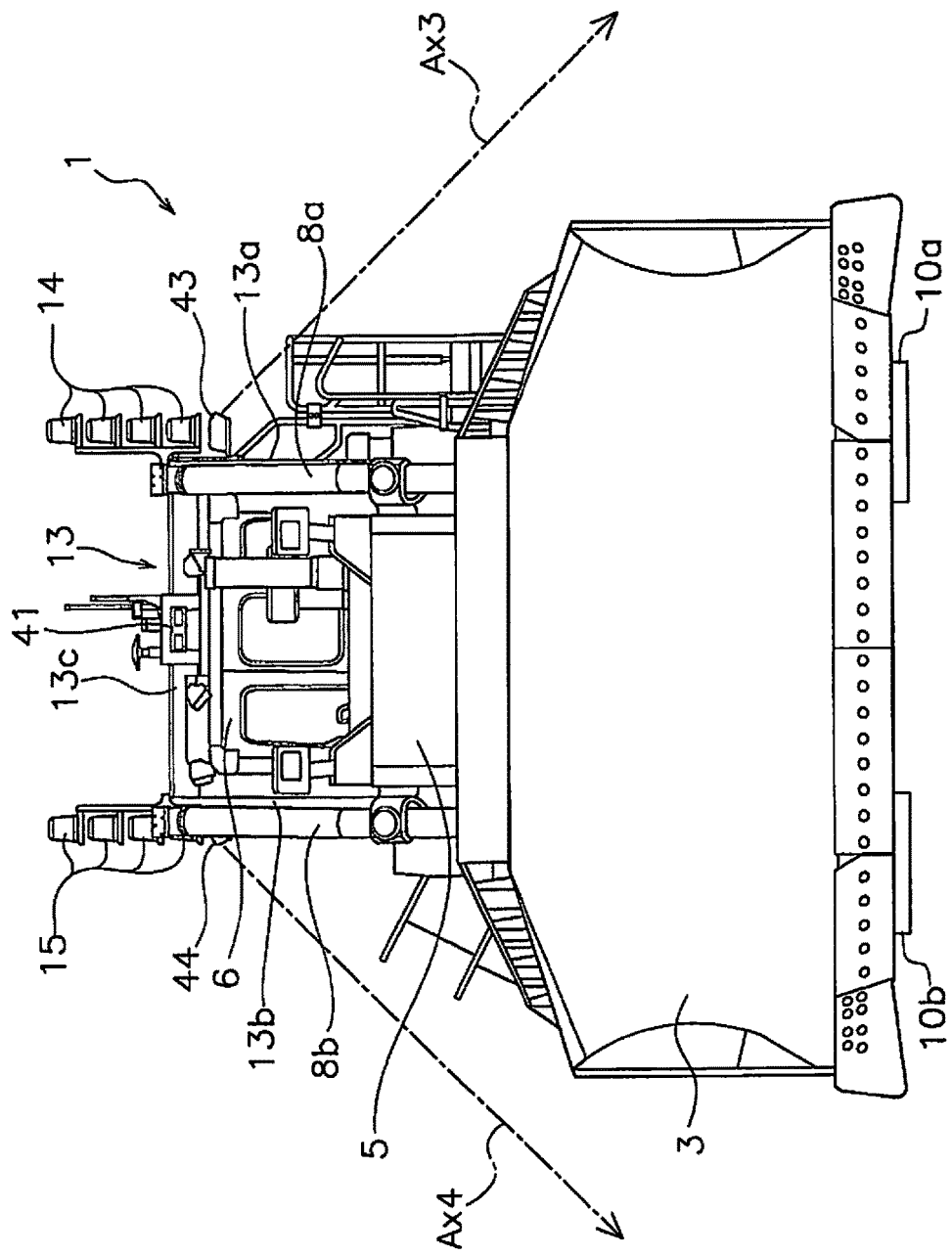
FIG. 5 is a front view of the bulldozer.

An optical axis Ax3 of the left side camera 43 extends to the left as seen in a plan view of the vehicle. An optical axis Ax4 of the right side camera 44 extends to the right as seen in a plan view of the vehicle. FIG. 5 is a front view of the bulldozer 1. As illustrated in FIG. 5, the optical axis Ax3 of the left side camera 43 is inclined to the left and downward. The optical axis Ax4 of the right side camera 44 is inclined to the right and downward. The left front camera 45 and the right front camera 46 are omitted from the drawing in FIG. 5.

The left front camera 45 captures images in the left front direction of the bulldozer 1 including the left edge portion of the blade 3. FIG. 6 is an enlarged perspective view illustrating the left front camera 45 and the surroundings thereof. FIG. 7 is an enlarged side view illustrating the left front camera 45 and the surroundings thereof. As illustrated in FIGS. 6 and 7, the left front camera 45 is attached to the left pillar portion 13a. The left side camera 43 is attached to the left pillar portion 13a via the left bracket 51. The left front camera 45 is disposed further to the left than the left pillar portion 13a. The left front camera 45 is disposed further to the front than the left pillar portion 13a. The left front camera 45 is disposed further to the front than the plurality of left indicator lamps 14. The left front camera 45 is disposed further to the front than the left side camera 43.

The left front camera 45 is disposed at the same height as the left side camera 43. However, the left front camera 45 may be disposed at a height that is different from that of the left side camera 43. The left front camera 45 is disposed higher than the upper edge of a window of the cab 6. However, the left front camera 45 may be disposed in a position at or below the upper edge of the window of the cab 6.

As illustrated in FIG. 3, the left front camera 45 overlaps the left crawler belt 10a as seen in the plan view of the bulldozer 1. The left front camera 45 is disposed further to the left than the left lift cylinder 8a. The left front camera 45 is disposed further to the left than the left side surface of the engine compartment 5. The left front camera 45 is disposed further to the right than the left arm 7a. The left front camera 45 is disposed further to the right than the left edge portion of the blade 3.

An optical axis Ax5 of the left front camera 45 extends toward the front as seen in the plan view of the bulldozer 1. However, the optical axis Ax5 of the left front camera 45 may be inclined to the left or right with respect to the straight forward direction as seen in the plan view of the bulldozer 1. In FIG. 3, the lines Va1-Va2 indicate the range of vision in the left-right direction of the left front camera 45. The range of vision Va1-Va2 of the left front camera 45 includes the left side edge of the blade 3 as seen in the plan view of the bulldozer 1. The range of vision Va1-Va2 of the left front camera 45 includes the left side surface of the engine compartment 5 as seen in the plan view of the bulldozer 1.

As illustrated in FIG. 2, the optical axis Ax5 of the left front camera 45 is inclined toward the front and downward as seen in the side view of the bulldozer 1. In FIG. 2, the lines Va3-Va4 indicate the range of vision in the up-down direction of the left front camera 45. The range of vision Va3-Va4 of the left front camera 45 includes the upper edge of the blade 3 as seen in the side view of the bulldozer 1. The range of vision Va3-Va4 of the left front camera 45 includes the front edge of the left crawler belt 10a as seen in the side view of the bulldozer 1. A first virtual straight line L1 connecting the view point of the left front camera 45 and the lower edge of the back surface of the blade 3 does not overlap with the left crawler belt 10a as seen in the side view of the bulldozer 1. A second virtual straight line L2 passing through the view point of the left front camera 45 and bordering the left crawler belt 10a intersects the ground surface G further toward the rear than the first virtual straight line L1. Therefore, images of the portion between an intersection P1 of the first virtual straight line L1 and the ground surface G, and an intersection P2 of the second virtual straight line L2 and the ground surface G can be captured by the left front camera 45 as a gap between the lower edge of the blade 3 and the left crawler belt 10a.

The right front camera 46 captures images in the right front direction of the bulldozer 1 including the right edge portion of the blade 3. As illustrated in FIG. 1, the right front camera 46 is attached to the right pillar portion 13b. The right front camera 46 is disposed further to the right than the right pillar portion 13b. The right front camera 46 is disposed further to the front than the right pillar portion 13b. The right front camera 46 is disposed further to the front than the plurality of right indicator lamps 15. The right front camera 46 is disposed further to the front than the right side camera 44. The right front camera 46 is disposed at the same height as the right side camera 44.

As illustrated in FIG. 3, the right front camera 46 overlaps the right crawler belt 10b as seen in the plan view of the bulldozer 1. The right front camera 46 is disposed further to the right than the right lift cylinder 8b. In FIG. 3, the lines Vb1-Vb2 indicate the range of vision in the left-right direction of the right front camera 46. The right front camera 46 is disposed in approximately left-right symmetry with the left front camera 45. Therefore, the right front camera 46 is disposed so as to be able to capture images of the gap between the lower edge of the blade 3 and the right crawler belt 10b in the same way as the left front camera 45.

As illustrated in FIG. 4, the remote operating device 30 includes a display 34. The display 34 is a device such as a CRT, and LCD, or an OELD. However, the display 34 is not limited to the aforementioned devices and may be another type of display.

The on-board controller 28 obtains image data captured by the plurality of cameras 41-46. The on-board controller 28 transmits the image data to the remote controller 32 via the communication devices 29 and 31. The remote controller 32 is programmed to display images showing the surroundings of the bulldozer 1 on the display 34 on the basis of the image data from the plurality of cameras 41-46. The remote controller 32 receives the image data captured by the plurality of cameras 41-46 in real time and can display the image data as a moving image on the display 34.

Figure 8:
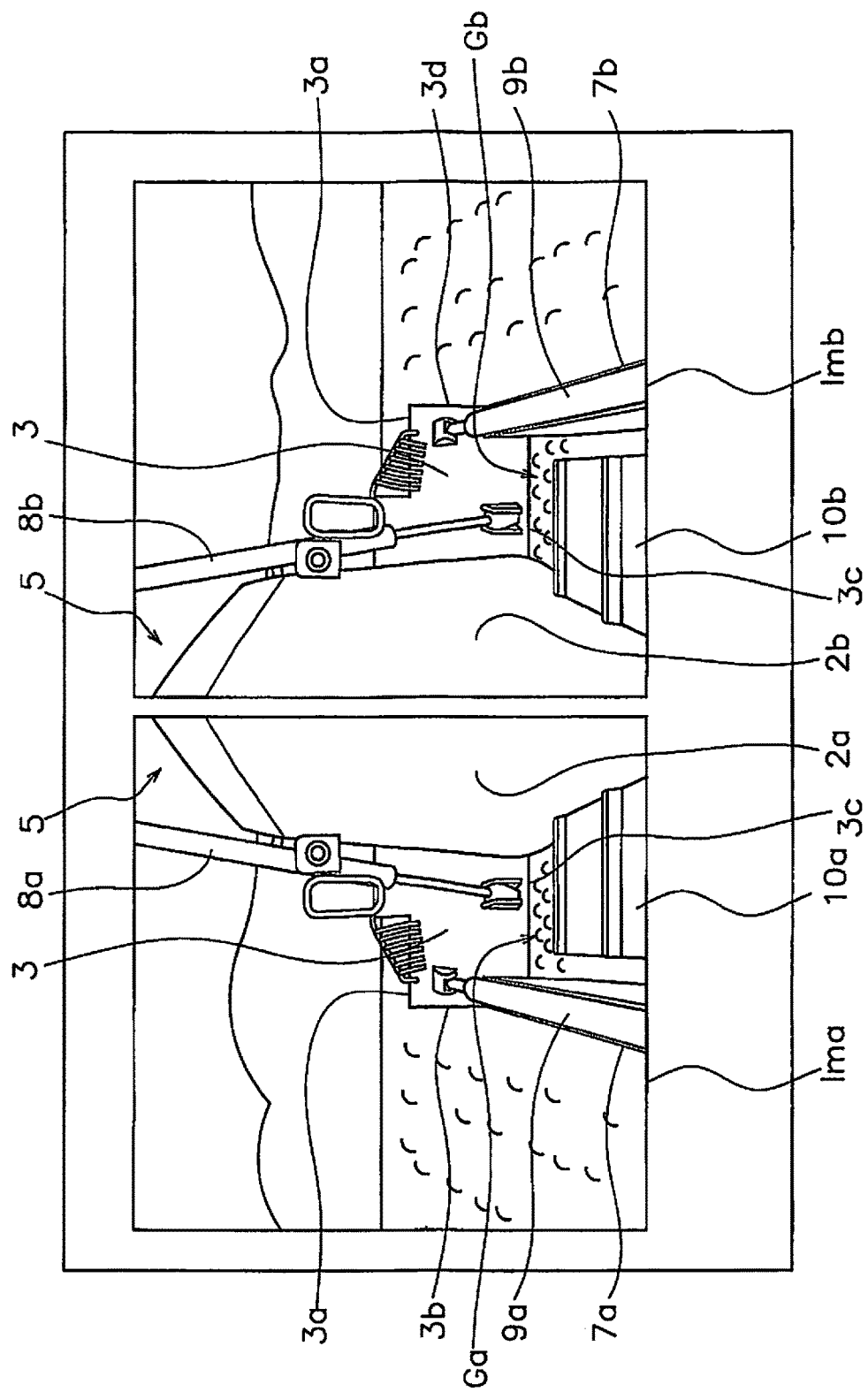
FIG. 8 illustrates an example of an image displayed on a display.

FIG. 8 is a view of images Ima and Imb captured by the left front camera 45 and the right front camera 46 and displayed on the display 34. The remote controller 32 respectively arranges the image Ima captured by the left front camera 45 and the image Imb captured by the right front camera 46 on the left and right and displays the images on the same screen of the display 34.

As illustrated in FIG. 8, the image Ima captured by the left front camera 45 includes a portion of an upper edge 3a, a portion of a left side edge 3b, and a portion of a lower edge 3c of the blade 3. The image Ima captured by the left front camera 45 includes the front portion of the left crawler belt 10a and the left side surface 2a of the vehicle body 2. The image Ima captured by the left front camera 45 includes a gap between the lower edge 3c of the blade 3 and the front edge of the left crawler belt 10a. Therefore, the image Ima captured by the left front camera 45 includes the ground surface Ga between the blade 3 and the left crawler belt 10a.

The image Imb captured by the right front camera 46 includes a portion of the upper edge 3a, a portion of a right side edge 3d, and a portion of a lower edge 3c of the blade 3. The image Imb captured by the right front camera 46 includes the front portion of the right crawler belt 10b and the right side surface 2b of the vehicle body 2. The image Imb captured by the right front camera 46 includes the gap between the lower edge 3c of the blade 3 and the front edge of the right crawler belt 10b. Therefore, the image Imb captured by the right front camera 46 includes the ground surface Gb between the blade 3 and the right crawler belt 10b.

The left front camera 45 is attached to the left pillar portion 13a at a position further to the left than the cab 6 in the bulldozer 1 according to the present exemplary embodiment as discussed above. The right front camera 46 is attached to the right pillar portion 13b positioned further to the right than the cab 6. As a result, the left front camera 45 and the right front camera 46 can be positioned to the outside in the left-right direction in comparison to when the left front camera 45 and the right front camera 46 are attached to the roof of the cab 6. As a result, images of the vicinity of the left lower edge of the blade 3 and the rotating conditions of the left crawler belt 10a as well as in front of the bulldozer 1 can be easily captured by the left front camera 45. Moreover, images in the vicinity of the right lower edge of the blade 3 and the rotating conditions of the right crawler belt 10b as well as in front of the bulldozer 1 can be easily captured by the right front camera 46. Therefore, the progress of work and the traveling state can be easily understood from the images captured by the left front camera 45 and the right front camera 46.

Although exemplary embodiments of the present invention have been described so far, the present invention is not limited to the above exemplary embodiments and various modifications may be made within the scope of the invention.

The bulldozer 1 is not limited to a vehicle that is operated remotely. The bulldozer 1 may be operated with operating members disposed in the cab 6.

The number of cameras is not limited to four. The number of cameras may be less than four or greater than four.

The left front camera 45 may be positioned further to the rear than the left side camera 43. The right front camera 46 may be positioned further to the rear than the right side camera 44.

The left front camera 45 may overlap the left pillar portion 13a as seen in the side view of the bulldozer 1. The right front camera 46 may overlap the right pillar portion 13b as seen in the side view of the bulldozer 1. The left front camera 45 and the right front camera 46 may be disposed at the same height as the beam portion 13c.

Figure 9:
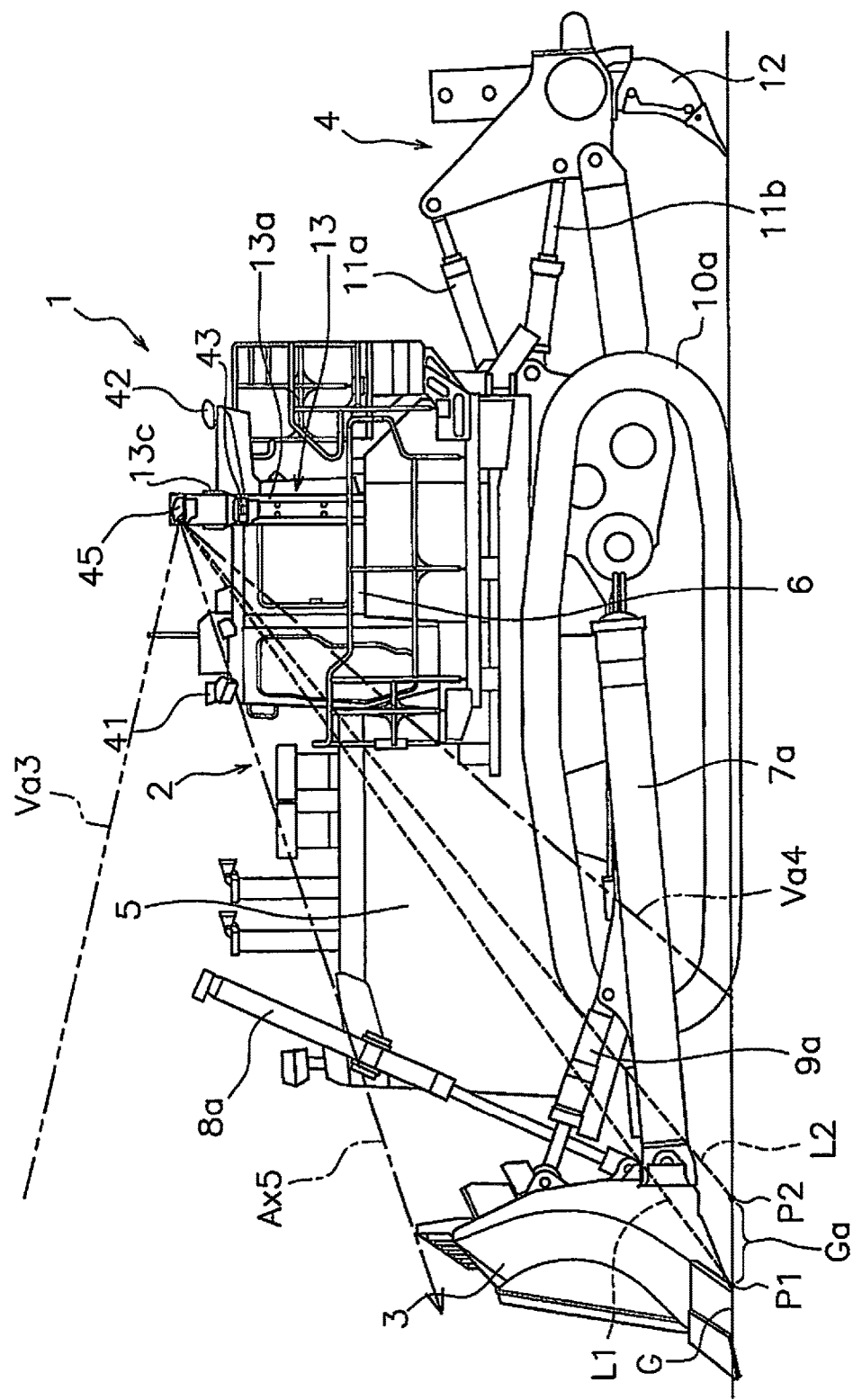
FIG. 9 is a side view illustrating the disposition of the left front camera according to another exemplary embodiment.

The left front camera 45 may be positioned higher than the roof of the cab 6. The right front camera 46 may be positioned higher than the roof of the cab 6. In this case, the left front camera 45 is preferably positioned so that images of the ground surface Ga between the blade 3 and the left crawler belt 10a can be captured as illustrated in FIG. 9 for example. The right front camera 46 may be positioned in the same way.

Figure 10:
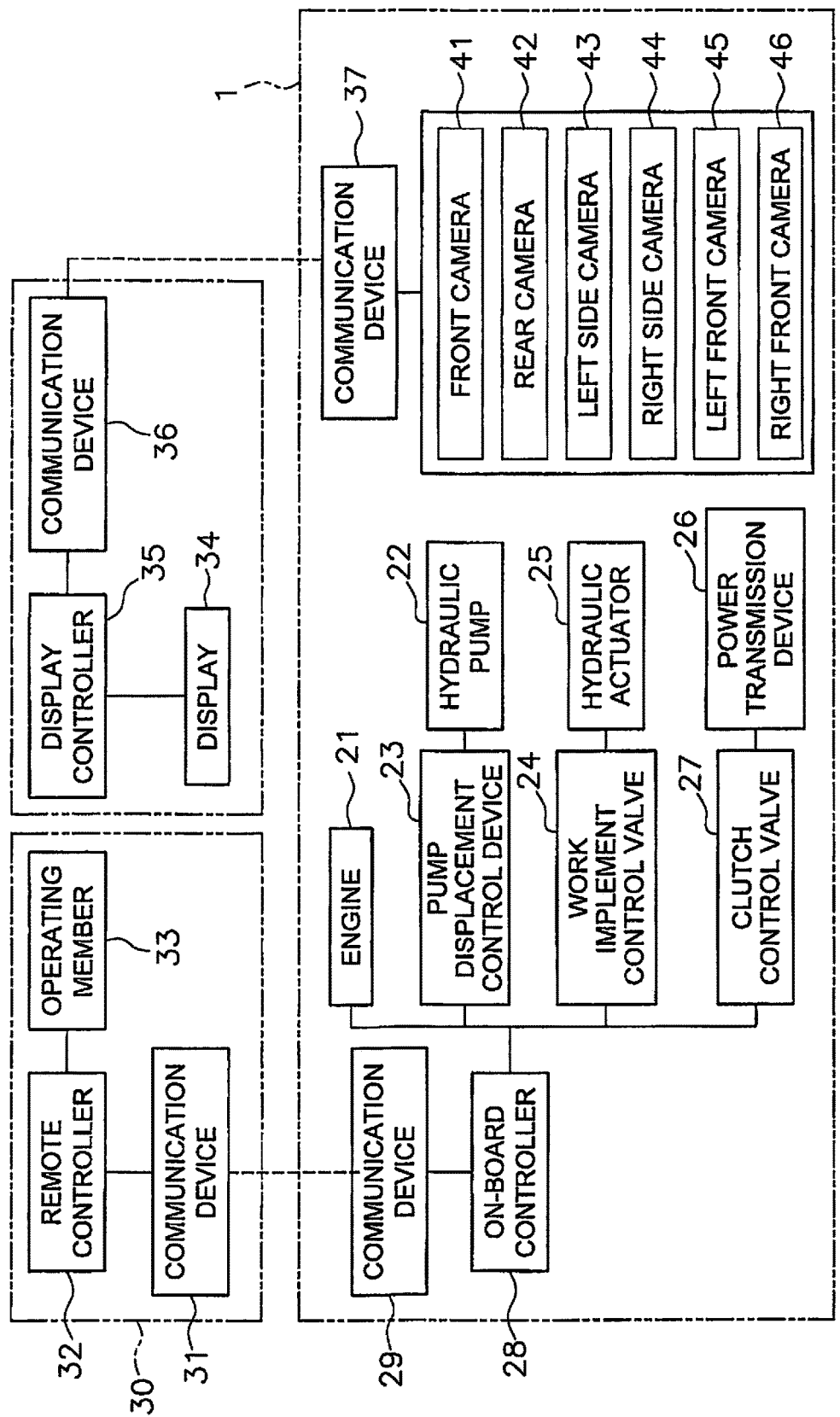
FIG. 10 is a block diagram illustrating a control system of the bulldozer according to still another exemplary embodiment.

A control system for displaying the images of the cameras on the display 34 may be provided in addition to the remote operating device 30. As illustrated in FIG. 10 for example, a display controller 35 separate from the remote controller 32 may receive the image data captured by the cameras 41-46 via communication devices 36 and 37. The display controller 35 may display the image data captured by the cameras 41-46 on the display 34.

According to the present invention, the progress of work and the traveling state can be easily understood with a camera attached to a bulldozer.

What is claimed is:
1. A bulldozer comprising:
a vehicle body;
a blade disposed in front of the vehicle body;
a left crawler belt disposed to the left of the vehicle body;
a right crawler belt disposed to the right of the vehicle body;

a first camera disposed to the left of the vehicle body, a first optical axis of the first camera facing forward and downward, the first camera overlapping the left crawler belt as seen in a plan view of the bulldozer and being arranged to capture a first image of a gap between a lower edge of the blade and the left crawler belt;

a second camera disposed to the right of the vehicle body, a second optical axis of the second camera facing forward and downward, the second camera overlapping the right crawler belt as seen in a plan view of the bulldozer and being arranged to capture a second image of a gap between a lower edge of the blade and the right crawler belt; and a display configured to display the first and second images side-by-side.

2. The bulldozer according to claim 1, further comprising a left hydraulic cylinder and a right hydraulic cylinder connected to the vehicle body and the blade, the first camera being disposed further to the left than the left hydraulic cylinder.

3. The bulldozer according to claim 1, further comprising a left hydraulic cylinder and a right hydraulic cylinder connected to the vehicle body and the blade, the second camera being disposed further to the right than the right hydraulic cylinder.

4. The bulldozer according to claim 1, further comprising a cab disposed on the vehicle body, the first camera being disposed higher than a roof of the cab.

5. The bulldozer according to claim 1, further comprising a cab disposed on the vehicle body, the second camera being disposed higher than a roof of the cab.

6. The bulldozer according to claim 1, further comprising a plurality of indicator lamps disposed to the left of the vehicle body and disposed in the up-down direction.

7. The bulldozer according to claim 6, wherein the first camera is disposed further to the front than the plurality of indicator lamps.

8. The bulldozer according to claim 1, further comprising a plurality of indicator lamps disposed to the right of the vehicle body and disposed in the up-down direction.

9. The bulldozer according to claim 8, wherein the second camera is disposed further to the front than the plurality of indicator lamps.

10. The bulldozer according to claim 1, further comprising a third camera disposed to the left of the vehicle body, a third optical axis of the third camera being inclined to the left and downward, and a fourth camera disposed to the right of the vehicle body, a fourth optical axis of the fourth camera being inclined to the right and downward.

11. The bulldozer according to claim 10, wherein the first camera is disposed further to the front than the third camera; and the second camera is disposed further to the front than the fourth camera.

12. The bulldozer according to claim 10, wherein the first camera is disposed at a same height as the third camera; and the second camera is disposed at a same height as the fourth camera.

13. A bulldozer body comprising:

a vehicle body including an engine compartment;

a left crawler belt disposed to the left of the vehicle body;

a right crawler belt disposed to the right of the vehicle body;

a first camera disposed to the left of the vehicle body, a first optical axis of the first camera facing forward and downward, the first camera overlapping the left crawler belt as seen in a plan view of the bulldozer and being arranged to capture a first image of a gap between a lower edge of the blade and the left crawler belt;

a second camera disposed to the right of the vehicle body, a second optical axis of the second camera facing forward and downward, the second camera overlapping the right crawler belt as seen in a plan view of the bulldozer and being arranged to capture a second image of a gap between a lower edge of the blade and the right crawler belt; and a display configured to display the first and second images side-by-side.

14. The bulldozer body according to claim 13, further comprising a cab disposed on the vehicle body, the engine compartment being disposed in front of the cab.

* * * * *